Jan. 4, 1944.     M. N. STATES     2,338,140
METHOD FOR MAKING COFFEE
Filed Dec. 16, 1939
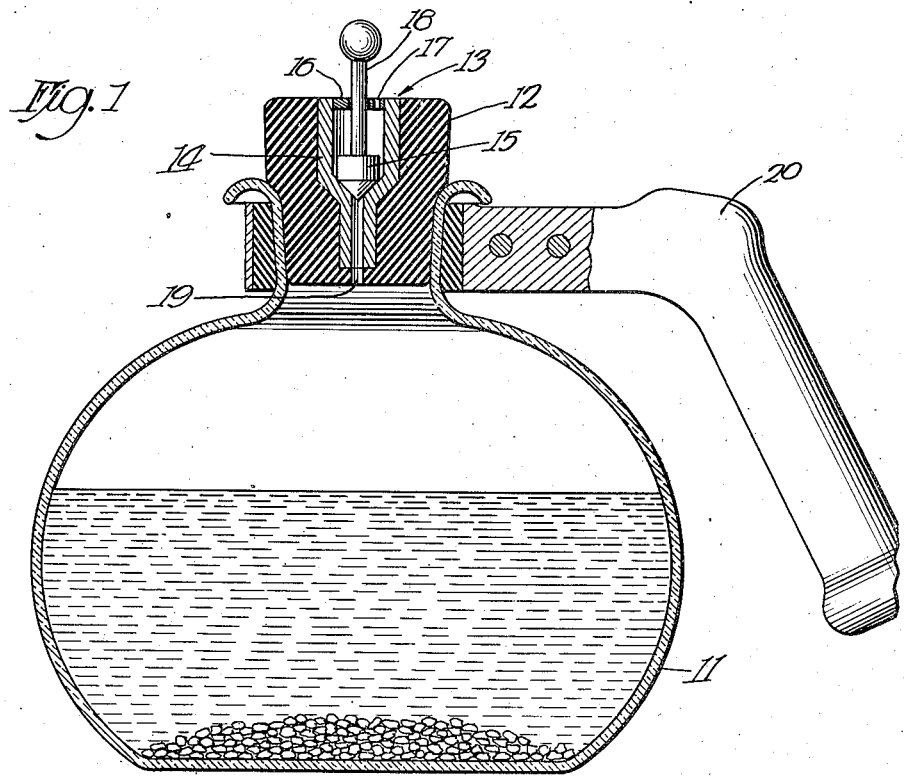
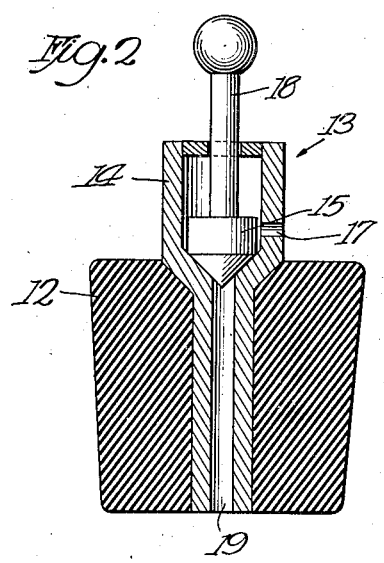
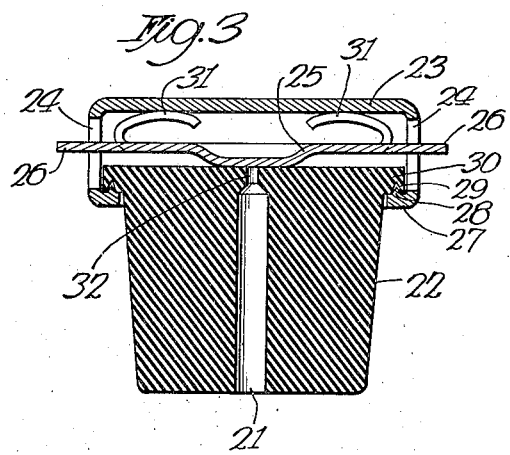
INVENTOR.
Marshall N. States
BY Marr, Brown & Co.
ATTORNEYS Patented Jan. 4, 1944

2,338,140

UNITED STATES PATENT OFFICE 2,338,140

METHOD FOR MAKING COFFEE

Marshall N. States, Evanston, Ill., assignor to Robert C. Brown, Jr., Highland Park, Ill., as trustee Application December 16, 1939, Serial No. 309,585

7 Claims. (Cl. 99—71)

This invention relates to a method of preparing coffee and similar beverages and to an apparatus suitable for use in the process.

It has been well-known for years that at least some of the substances providing coffee with its characteristic flavor and aroma are volatile in nature and subject to undesirable changes if exposed to air for any considerable period of time. Manufacturers, recognizing this fact, have exercised great care in packing their coffee to insure its arrival in proper condition. However, even when properly prepared coffees are used, coffee brewers now in use are usually unable to retain in the beverage the full value of flavor and aroma contained in the coffee itself, as they expose the solution containing the aroma giving and flavoring substances to the air at elevated temperatures for considerable periods of time, thereby boiling off or evaporating the materials most desirable in the finished product.

Therefore, an object of this invention is to provide a method whereby coffee and similar beverages may be prepared without substantial loss of flavoring and aroma imparting substances.

Another object is to provide an apparatus suitable for use in my process in which any reasonable amount of beverage may be prepared regardless of the capacity of the container used.

Further objects and advantages of my invention will become apparent from the following description, and the accompanying drawing, in which—

Fig. 1 is a vertical section of my preferred form of coffee brewer;

Fig. 2 is an enlarged vertical section of a slightly modified form of stopper; and Fig. 3 illustrates another form of stopper.

For the purpose of illustration, the following description of my process and apparatus will be limited to the preparation of coffee but it is to be understood that the same process and apparatus is equally adaptable to the preparation of other similar beverages.

Referring to Fig. 1, my preferred form of coffee brewer consists of a container 11, which may be in the form of a carafe or decanter, fitted with a stopper 12 which contains a valve 13 comprising a tubular valve body 14, the lower portion of which is constricted, a valve plunger 15, operating within the valve body and seating itself in the constricted portion thereof, a valve top 16 fitting firmly into, or around, the valve body 14 in which is provided a port or ports 17 and an opening through which a valve stem 18 projects, and a valve stem 18 connected to the valve plunger 15 and projecting beyond the valve body 14 through the valve top 16 by means of which the valve plunger may be manually raised from its seat to release a vacuum formed in the container 11. A longitudinal passageway 19 is provided through the stopper 12 in which the valve 13 is firmly positioned. A handle 20 may be attached to the container for convenience in dispensing.

The container 11 may be of glass or other suitable material and is provided with a neck of suitable diameter, flaring outwardly at the lip to aid in pouring. It may be in the form of a carafe or decanter having a globe-like container portion and an elongated neck opening, whereby the air is readily displaced by vapor and steam when heat is applied to the vessel. By means of this arrangement it is only necessary to bring the water to a boil and then remove the vessel from the source of heat. The vessel is sealed immediately before it is removed, and the brewing is effected in a partial vacuum formed by the condensation of the vapor and steam. The material of the container 11 should be moderately resistant to thermal shock and sufficiently strong to resist atmospheric pressure when the interior of the container is substantially below atmospheric pressure.

The stopper 12 fits into the neck of the container 11 with sufficient tightness to prevent the leakage of air into the container and is preferably made of high-grade rubber compounded to resist oxidation and aging. One or more passageways 19 are provided through the stopper 12 connecting the interior of the container 11 with the atmosphere. For the purposes of illustration only one such passageway is shown in the drawing.

The valve 13 is preferably of brass or other metal which may be plated with chromium, cadmium or nickel, if desired, and is incorporated in the passageway 19 where it is maintained normally in its closed position, preferably by gravity. When the stopper 12 is placed in the neck of the container 11 and heat is applied to the container and its contents, the valve 13 operates to allow the release of the pressure developed within the container, as the pressure is transmitted through the passageway 19 to the base of the valve plunger 15, forcing it, with its stem 18 upwards, thereby allowing the pressure to escape through the port or ports 17. The valve 13 will assume a lower temperature than the escaping vapors due to its higher heat conductivity and exposure to air, and therefore, acts as a condenser. The droplets of condensate remaining in the valve form a liquid seal when the valve assumes the closed position thereby eliminating the necessity of carefully machining the valve plunger and seat. When a vacuum is developed within the container 11 by the pressure of the atmosphere it forces the valve plunger 15 firmly into its seat, and so prevents the entrance of air into the container. If desired, the outlet ports 17 may be placed in the valve top 16, as shown in Fig. 1, rather than through the valve body, as shown in Fig. 2.

If desired, a stopper of the type illustrated in Fig. 3 may be used, in which case a passageway 21 is provided through the stopper 22 connecting the interior of the container 11 with the interior of the stopper cap 23, to which air has free access through openings 24. A valve 25 is provided to seal the passageway 21 under normal conditions, but is capable of release, either manually, as by lifting the lugs or projections 26, or by an excess of pressure formed within the container 11.

The stopper cap 23 may be fastened to the stopper 22 in any desired manner, preferably by means of the inwardly extending flange portion 27 of the cap 23, on the inner side of which is provided projections or teeth 28 adapted to engage with corresponding indentations 29 properly positioned in the underside of an outwardly extending flange 30 of the stopper 22.

The valve 25 is held against the passageway 21 by means of springs 31 which may be integral with the valve. The action of these springs against the stopper cap 23 not only firmly seats the valve 25 against the passageway 21 but also serves to fasten the cap 23 more firmly to the stopper by forcing the projections 28 into the corresponding indentations 29 on the underside of the stopper flange 30. The portion of the valve 25 that seals the passageway 21 is preferably depressed somewhat below the normal plane of the valve to insure a more satisfactory seal. The lugs 26 are a part of the valve 25 and extend through the openings 24 in the cap 23. By raising these lugs 26, or any one of them, the valve 25 is lifted from the passageway 21 and air is allowed free access to the interior of the container 11. As a vacuum is developed within the container 11, during my process, when this type of valve is used I prefer to constrict the passageway 21 at its upper terminal portion, as shown at 32, thereby facilitating the release of the valve 25 and reducing the possibility of leakage.

Regardless of the type of valve used, I prefer to provide means for manually releasing the valve to destroy the vacuum formed in the container, as by raising the valve stem 18 or the lugs 26 to open the passageway into the container, for unless this is done the stopper is often quite difficult to remove.

To prepare coffee in the apparatus described above, my improved method consists of the following:

Place the desired amount of ground coffee beans in the container 11, then add the proper amount of water, either hot or cold, but not to exceed 90 percent of the capacity of the container. Insert the stopper assembly in the neck of the container 11 and heat to boiling, then remove from the source of heat and allow to cool. The slight steam pressure so formed within the container forces the valve plunger 15 outwardly into the open position, allowing the air in the container and the vapors arising from the heated solution to move through the passageway 19 into the interior of the valve 13 where at least a portion of the vapors are condensed, the excess escaping through the port or ports 17. When removed from the source of heat, the pressure within the container rapidly decreases to a point where it is insufficient to maintain the valve plunger 15 in its open position. When this point is reached, the plunger 15 and stem 18 fall into the closed position on the valve seat in the constricted portion of the valve body 14, and the condensate remaining in the valve forms a liquid seal over and around the valve plunger 15, effectively preventing the entrance of air into the container. As the container 11 and its contents cool, the pressure within the container is rapidly lowered below atmospheric due to the condensation of the steam. This reduced pressure in combination with the heat of the water brings the aromatic and flavoring substances in the ground coffee rapidly to the surface of the particles and into solution.

The container is maintained in a sealed condition for about five minutes or until the action of the coffee particles has ceased. The vacuum is then released by raising the valve stem 18 which opens the passageway 19 into the container. As this equalizes the interior and exterior pressures, the stopper may then be easily removed. When the vacuum is released any small coffee particles remaining suspended in the liquid will become saturated and immediately sink to the bottom, a strainer or filter not being needed, as all the coffee particles are completely saturated and will cling to the bottom of the flask. If however, the chaff or similar foreign material is present, it may not become saturated, so a filter may be employed, but is not necessary if a good grade of coffee is used.

As the precise reaction occurring during this process of extraction is not completely understood, I do not wish to be confined by any theory herein advanced, but for clarity of illustration I will explain the reaction to the best of my knowledge and belief. The aromatic and flavoring ingredients, which may be oil, esters, or other compounds, are more or less water soluble materials held within the cells and body of the coffee particles. To allow water to penetrate the interior cells and dissolve these ingredients it is necessary to release in some manner the entrapped air within the cells.

The entrapped air is of course at normal atmospheric pressure, so unless some force is applied there is no tendency for this air to move out of the cells. By reducing the pressure against this entrapped air, the balance of pressures within and without the cells is disturbed, so the air will by its own pressure move outwardly until the internal pressure balances the external. This action is augmented by the application of heat to the air within the cells. When the entrapped air has been released, the water may enter and dissolve the desired aromatic and flavoring ingredients.

Upon release of the vacuum the reverse of this process occurs, as the external pressure is then greater than that of the air remaining in the cells, so the water is forced into the cells until the external and internal pressures are again equal.

The air drawn from the coffee particles may contain certain vapors or other substances imparting flavor and aroma to the beverage. Any portion of these vapors not dissolved by the water while the air bubble is rising to the surface is retained in contact with the solution after release, as the container is closed. Likewise, any dissolved ingredients volatilized by the heat or reduced pressure will condense upon the container walls above the liquid level and return to the solution by gravity.

Observation of my process tends to substantiate this theory, as the coffee particles may be observed to become covered with small air bubbles, rise to the surface where the bubbles are released, and then sink, repeating this operation several times until the particles apparently become completely saturated with water, when they sink to the bottom of the container, where they remain. Once the particles have settled to the bottom they cannot be re-suspended even by continued shaking.

From the foregoing description, the advantages inherent to my process are more or less obvious. The parts are few in number and easily cleaned. Substantially all of the aromatic and flavoring substances in the coffee are retained as the container is sealed against their escape during practically the entire process. Furthermore, the minimum amount of beverage that may be prepared is not limited by the capacity of the container, as the coffee and water are in direct contact at all times. The harsh and unpleasant flavor sometimes present in coffee that has been overboiled is not present, as the continued boiling which is necessary to extract these substances is neither necessary nor desirable in my process.

It is not necessary that the coffee be allowed to cool extensively as a relatively small drop in temperature produces a marked reduction in pressure; for example, as the liquid cools from 100° C. to 90° C., the pressure is reduced about 30% and if cooled further to 80° C. the pressure is reduced about 50%. When making large quantities of coffee, other methods of producing a vacuum may be used, such as an ordinary aspirator or vacuum pump connected to the upper part of the container or stopper in any desired manner, but this procedure is not as desirable for ordinary household use as that herein described due to the extra equipment required.

The foregoing description illustrates only the preferred embodiment of my process and apparatus which are obviously capable of considerable modification. In the process for example, the stopper may be inserted shortly before the container is removed from the source of heat, or the coffee particles may be added after the water is heated, or heated water may be added to the coffee particles, or the time required for the process may be reduced by rapidly cooling the container after the stopper has been inserted. The apparatus is also capable of wide variation as the shape of the container is not primarily important. The stopper may be used either with or without a valve or valves, it being essential, however, that the stopper be constructed to produce an air tight seal across or within the neck of the container. I do not therefore wish to limit myself to the specific embodiment of my invention hereinbefore disclosed except as defined by the appended claims.

I claim:

1. The process of brewing coffee or similar beverages comprising the steps of placing the material from which the flavoring substances are to be extracted in a container, adding water to the container, bringing the water to the boiling point, then sealing the container and allowing it to cool without the application of any additional heat.

2. The process of brewing coffee or similar beverages, comprising the steps of mixing ground coffee beans and water in a container, heating the mixture of ground coffee beans and water to boiling, exhausting steam and air until substantially all air is exhausted from the container, sealing the container allowing the container to cool without the addition of further heat, and then releasing the vacuum within the container whereby the ground coffee beans become saturated with water and sink.

3. The process of brewing coffee or similar beverages, comprising the steps of partially filling a container with a mixture of ground coffee beans and water, heating said mixture to a boil, sealing the container, then without further addition of heat condensing steam within the container to produce a partial vacuum, and subsequently releasing said vacuum, the process being characterized by the refluxing condenser action of the container walls on volatile coffee ingredients vaporized while under partial vacuum.

4. The process of brewing coffee comprising the steps of mixing ground coffee with water in a container, bringing the mixture of ground coffee and water to a boil and boiling just long enough to displace substantially all the air in the container with steam, sealing the container and immediately thereafter ceasing further application of external heat, then allowing the coffee to brew under vacuum formed by the condensation of steam within the container for a period of approximately five minutes, and then releasing the vacuum.

5. The process of preparing coffee or similar beverages, wherein ground coffee is continuously immersed in water in a container having a restricted opening and the beverage ultimately separated from the grounds by decantation, said process being characterized by the use of external heat to bring the water to a boil, sealing the opening, and immediately thereafter brewing the coffee in said container without the application of additional heat.

6. A method of brewing coffee and the like, which comprises mixing ground coffee with water in a container having a small neck with an opening, applying heat to the container for heating the liquid and displacing the air in said container with steam, sealing said container by closing said opening, brewing the coffee without the addition of further external heat, and finally releasing the vacuum.

7. A method of brewing coffee and the like, which comprises mixing ground coffee with water in a container having a small open passage, heating the container just long enough to cause the steam to displace the air in the container, and then removing the container from the fire and closing the passage, then permitting the coffee to brew until the steam and vapor have been condensed to form a partial vacuum above the brew and the coffee grounds finally to settle, then releasing the partial vacuum, and finally pouring the brew from the container ready to serve.

MARSHALL N. STATES.